United States Patent
Bates et al.

(10) Patent No.: US 8,025,534 B2
(45) Date of Patent: Sep. 27, 2011

(54) SYSTEM AND METHOD FOR COUPLING A LTO HH TAPE DEVICE WITH A SERIAL ATTACHED SCSI CONNECTION TO A SAS-CABLE

(75) Inventors: Allen Keith Bates, Tucson, AZ (US); Katsuyuki Nojima, Yokohama (JP); Daniel James Winarski, Tucson, AZ (US); George G. Zamora, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 7 days.

(21) Appl. No.: 12/365,740

(22) Filed: Feb. 4, 2009

(65) Prior Publication Data

US 2010/0199013 A1  Aug. 5, 2010

(51) Int. Cl.
*H01R 25/00* (2006.01)

(52) U.S. Cl. .......................................... 439/638

(58) Field of Classification Search .................. 439/638, 439/181
See application file for complete search history.

(56) References Cited

U.S. PATENT DOCUMENTS

| | | | |
|---|---|---|---|
| 5,540,601 A | 7/1996 | Botchek | |
| 5,745,795 A | 4/1998 | Pecone et al. | |
| 6,480,925 B1 | 11/2002 | Bodo | |
| 6,790,079 B2 * | 9/2004 | Berens et al. | 439/534 |
| 6,830,483 B1 * | 12/2004 | Wu | 439/638 |
| 7,090,538 B1 * | 8/2006 | Huang | 439/638 |
| 7,309,246 B1 * | 12/2007 | Walter et al. | 439/181 |
| 7,481,679 B1 * | 1/2009 | Stotz et al. | 439/638 |

* cited by examiner

*Primary Examiner* — Tho D Ta

(74) *Attorney, Agent, or Firm* — Cahn & Samuels, LLP

(57) ABSTRACT

A method, system and apparatus for efficiency coupling a LTO HH tape drive device having a Serial Attached SCSI connector to a SAS-Cable. The method for coupling a LTO HH tape drive device having a Serial Attached SCSI connector to a SAS-Cable includes employing an adapter having a structure featuring an offset between the centerlines of the LTO side and the SAS-Cable side. The method also includes reducing the overmold structure of the adapter on the SAS Cable Side of the adapter to prevent interference from excess structure contained on the connector during the insertion of the SAS Cable as well as enhancing the overmold structure of the adapter on the LTO drive side of the adapter to facilitate a secure grip on the adapter. The method further includes offsetting the centerlines of the LTO side and the SAS-Cable side to enhance the applicability of the adapter to a wide range of SAS-Cables and guiding the insertion of the adapter into a LTO drive via insertion guide pins to prevent the damage to the adapter pins on the LTO drive side of the adapter.

17 Claims, 4 Drawing Sheets

SYSTEM AND METHOD FOR COUPLING A LTO HH TAPE DEVICE WITH A SERIAL ATTACHED SCSI CONNECTION TO A SAS-CABLE

I. FIELD OF THE INVENTION

This invention relates to a system and method for efficiency coupling a LTO HH tape drive device having a Serial Attached SCSI connector to a SAS-Cable.

II. BACKGROUND OF THE INVENTION

The LTO (Linear Tape Open) HH (Half-High) tape drive is commonly configured to have a SAS (Serial Attached SCSI) connector at the rear of the drive, near the bottom surface of the drive. When a user mounts the drive to a flat bottom surface and attempts to connect a mating SAS cable to the LTO HH tape drive, the connector of the cable often interferes with the mounting surface that the drive is mounted to. This problem usually is caused by the existing overmold structure or overmold of the connector on the cable. The dimensions of the overmold vary depending upon the supplier of the cable. Often times a user has an existing cable that works with may of the other devices in a server or library however it is not uncommon that this cable will not work with the LTO HH tape drive because of the interference discussed above. This condition is problematic adding to the complexity of system installations since connecting the tape drive through existing cables supplied by various vendors is a hit or miss proposition. Because of the added complexity of the installation, customers are confronted with the added costs of replacing cables that won't fit the drive, but are otherwise serviceable. What is needed is a low-cost adapter to enable customers to use the LTO HH tape drive with the existing SAS cables.

III. SUMMARY OF THE INVENTION

Disclosed is are methods, systems and apparatus for efficiency coupling a LTO HH tape drive device having a Serial Attached SCSI connector to a SAS-Cable. The method for coupling a LTO HH tape drive device having a Serial Attached SCSI connector to a SAS-Cable includes employing an adapter having a structure featuring an offset between the centerlines of the LTO side and the SAS-Cable side. The method also includes reducing the overmold structure of the adapter on the SAS Cable Side of the adapter to prevent interference from excess structure contained on the connector during the insertion of the SAS Cable as well as enhancing the overmold structure of the adapter on the LTO drive side of the adapter to facilitate a secure grip on the adapter. The method further includes offsetting the centerlines of the LTO side and the SAS-Cable side to enhance the applicability of the adapter to a wide range of SAS-Cables and guiding the insertion of the adapter into a LTO drive via insertion guide pins to prevent the damage to the adapter pins on the LTO drive side of the adapter.

Also disclosed is an adapter for coupling a LTO HH tape drive device having a Serial Attached SCSI connector to a SAS-Cable having a structure having an LTO side and a SAS-Cable side, the adapter having an offset between the centerlines of the LTO side and the SAS-Cable side. The adapter also has a reduced overmold structure on the SAS cable side and an enhanced overmold structure on the LTO side of the adapter. The LTO side also includes a plurality of insertion guide pins to ensure proper alignment during the insertion of the adapter into a LTO HH tape drive wherein the LTO side of the adapter is inserted into the SCSI connector of the LTO HH tape drive and the enhance overmold structure on the LTO side provides a supporting structure for grasping the adapter. A SAS-Cable is inserted in the SAS-Cable side of the adapter and the reduced overmold structure prevents the adapter surfaces from interfering with the cable interface.

Also disclosed is an adapter for coupling a LTO HH tape drive device having a Serial Attached SCSI connector to a SAS-Cable having a structure having an LTO side and a SAS-Cable side, the adapter having an offset between the centerlines of the LTO side and the SAS-Cable side. The adapter also has a reduced overmold structure on the SAS cable side and an enhanced overmold structure on the LTO side of the adapter. The LTO side also includes a plurality of insertion guide pins to ensure proper alignment during the insertion of the adapter into a LTO HH tape drive wherein the LTO side of the adapter is inserted into the SCSI connector of the LTO HH tape drive and the enhance overmold structure on the LTO side provides a supporting structure for grasping the adapter. A SAS-Cable is inserted in the SAS-Cable side of the adapter and the reduced overmold structure prevents the adapter surfaces from interfering with the cable interface.

The LTO side of the adapter includes data and power connectors disposed thereon as well as at least one ground connector disposed thereon. The enhanced overmold structure includes outer and inner overmold areas, the outer overmold area having conductive properties and the inner overmold area having insulating properties. The inner overmold area insulates the data and power connectors from each other and the conductive outer overmold area. The outer overmold area is connected to a ground terminal such that when the adapter is handled to connect the SAS-Cable to the LTO HH tape drive the outer conductive overmold area dissipates any electric charge imparted thereon by the handler such that the electrostatic discharge does not damage the LTO HH tape drive.

In the detailed description, references to "one embodiment", "an embodiment", or "in embodiments" mean that the feature being referred to is included in at least one embodiment of the invention. Moreover, separate references to "one embodiment", "an embodiment", or "in embodiments" do not necessarily refer to the same embodiment; however, neither are such embodiments mutually exclusive, unless so stated, and except as will be readily apparent to those skilled in the art. Thus, the invention can include any variety of combinations and/or integrations of the embodiments described herein.

Given the following enabling description of the drawings, the method should become evident to a person of ordinary skill in the art.

IV. BRIEF DESCRIPTION OF THE DRAWINGS

In order to describe the manner in which the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings.

V. DETAILED DESCRIPTION

Various embodiments are discussed in detail below. While specific implementations of the disclosed technology are discussed, it should be understood that this is done for purposes of illustration. A person skilled in the relevant art will recognize that other components and configurations may be used without departing from the spirit and scope of the invention.

In order to address the above mentioned problem with the compatibility of many currently used SAS connectors with LTH HH tape drives, an adapter incorporating and offset and a repositioned overmold structure area is employed.

Figure 1:
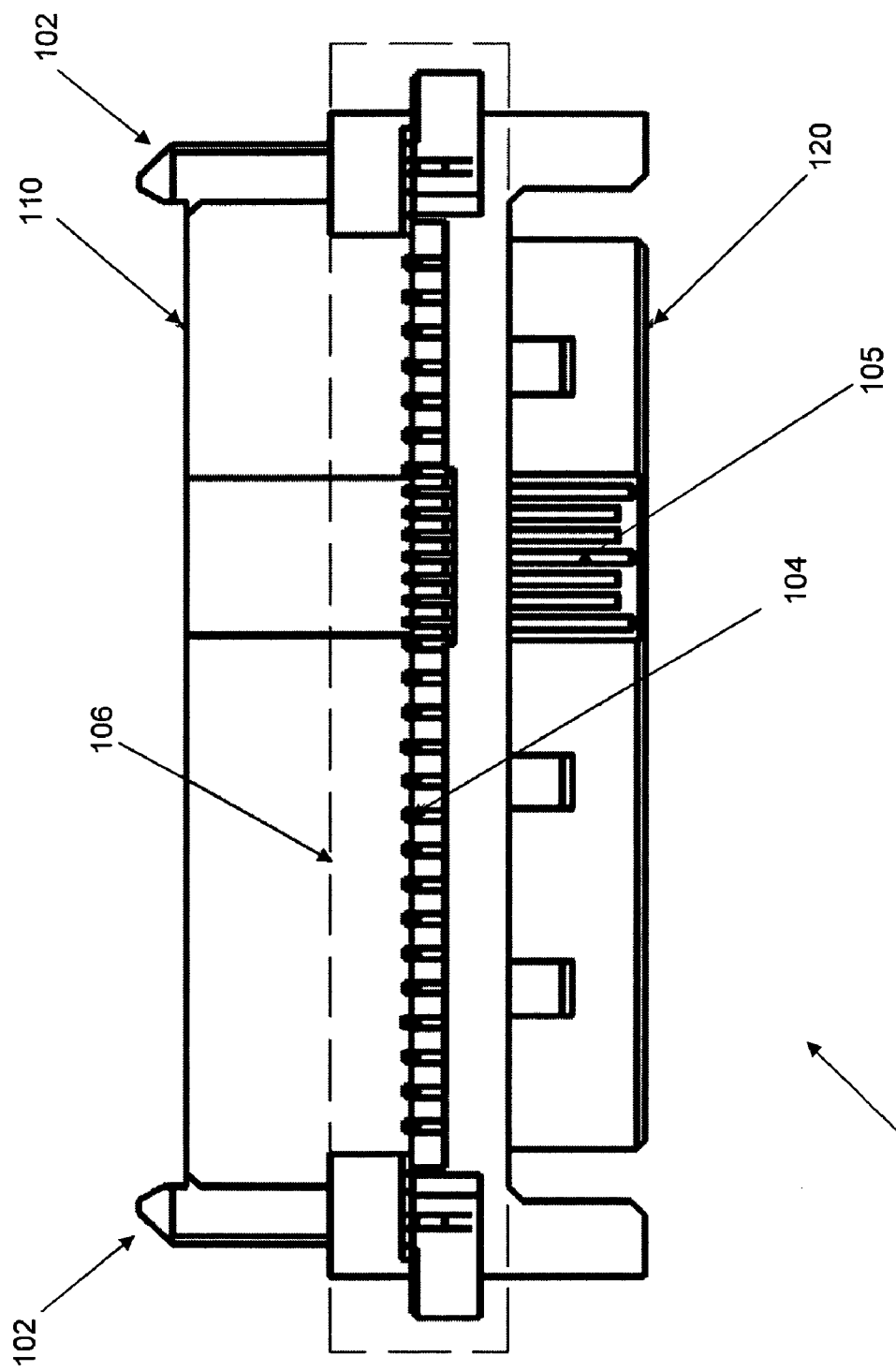
FIG. 1 illustrates a top view of an exemplarily embodiment of the SAS Cable Adapter
Figure 2:
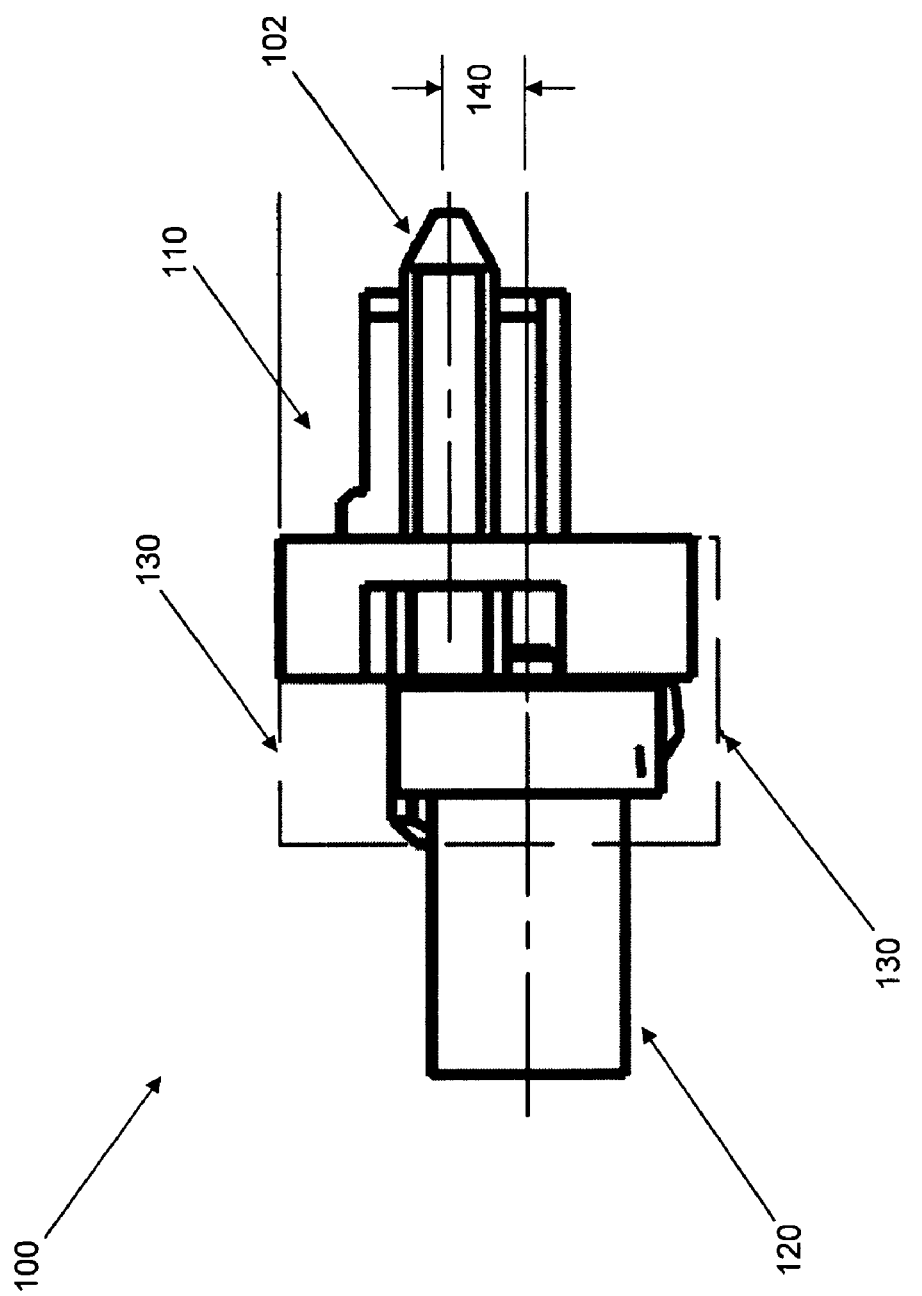
FIG. 2 illustrates a side view of an exemplarily embodiment of the SAS Cable Adapter.

Referring to the Figures, wherein like elements are denoted by like find numbers, FIGS. 1 and 2, illustrate to and side views, respectively, of an exemplarily embodiment of the SAS Cable Adapter 100. The adapter 100 for coupling a LTO HH tape drive device having a Serial Attached SCSI connector to a SAS-Cable incorporates a structure having an LTO side 110, and a SAS-Cable side 120. The adapter 100 incorporates an offset 140 between the centerlines of the LTO side 110 and the SAS-Cable side 120 visible from the side view of the exemplarily embodiment shown in FIG. 2. The adapter 100 also has a reduced overmold structure 130 on the SAS cable side 120 and an enhanced overmold structure 106 on the LTO side 110 of the adapter 100.

The LTO side 110 of the adapter 100 includes data and power connectors 104 disposed thereon which interface with the LTO drive. These connectors 104 appear as pins 105 on the cable side 120 of adapter 100. The LTO side 110 of the adapter 100 also includes a plurality of insertion guide pins 102 to ensure proper alignment of the adapter 100 and drive during the insertion of the adapter into a LTO HH tape drive wherein the LTO side 110 of the adapter 100 is inserted into the SCSI connector of the LTO HH tape drive (not shown) and the enhanced overmold structure 106 on the LTO side 110 provides a supporting structure for grasping the adapter 100 during insertion or removal. A SAS-Cable is inserted in the SAS-Cable side 120 of the adapter and the reduced overmold structure 130 prevents the adapter surfaces from interfering with the cable interface.

Figure 3:
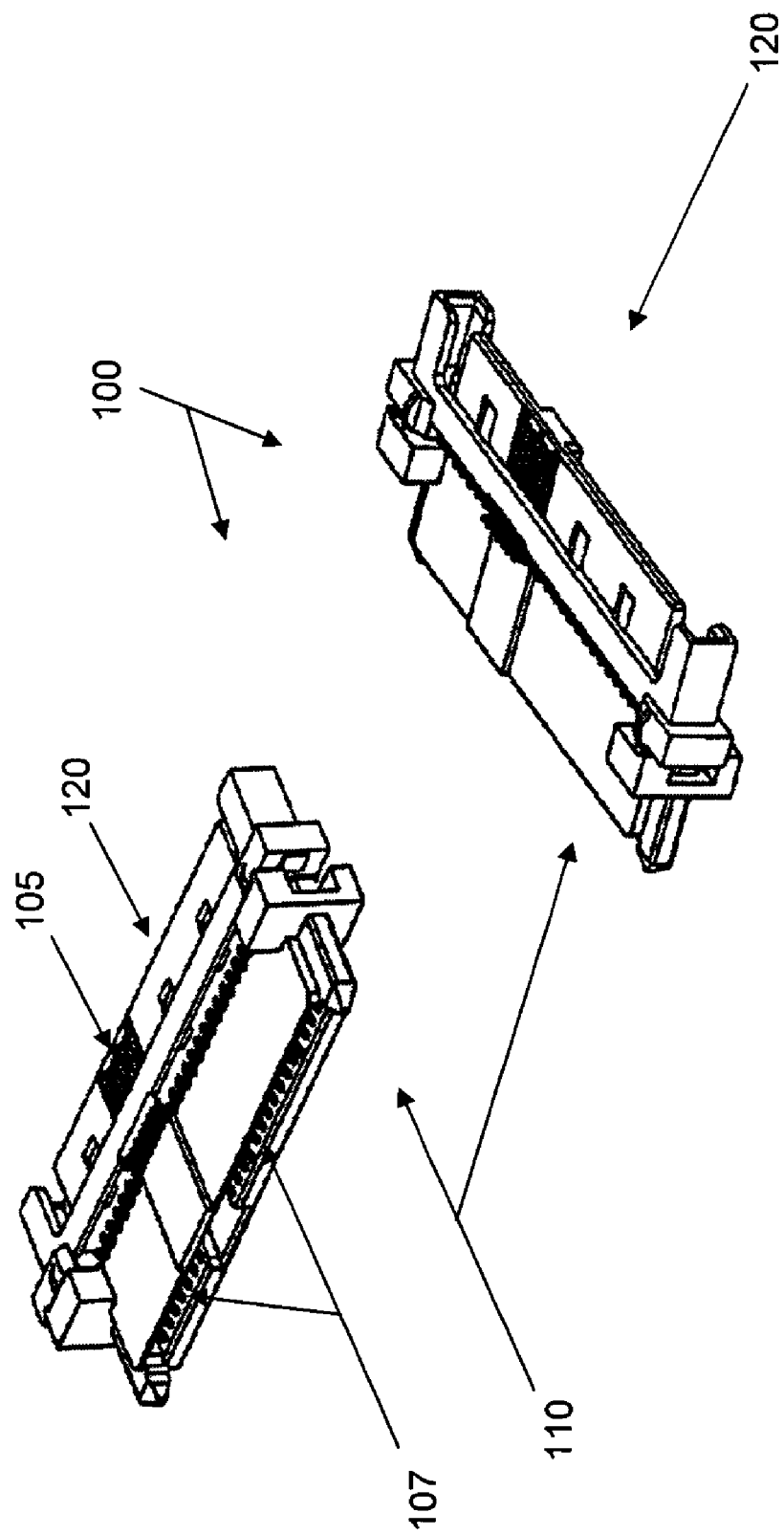
FIG. 3 illustrates an isometric view of an exemplarily embodiment of the SAS Cable Adapter.

FIG. 3 shows two isometric views of the adapter 100 illustrating the LTO Drive side 110 of the adapter 100 and the SAS Cable side 120 of the adapter 100. Pins 105 on the cable side 120 of adapter 100 transmit data as well as provide power and ground through connectors 104 (FIG. 1) to pins 107 on the LTO Drive side 110. The LTO Drive side 110 is inserted into the LTO Tape Drive (not shown). A SAS cable (not shown) is inserted into the SAS Cable side 120 of the adapter 100 providing efficient coupling of the SAS Cable to the LTO Tape Drive.

Figure 4:
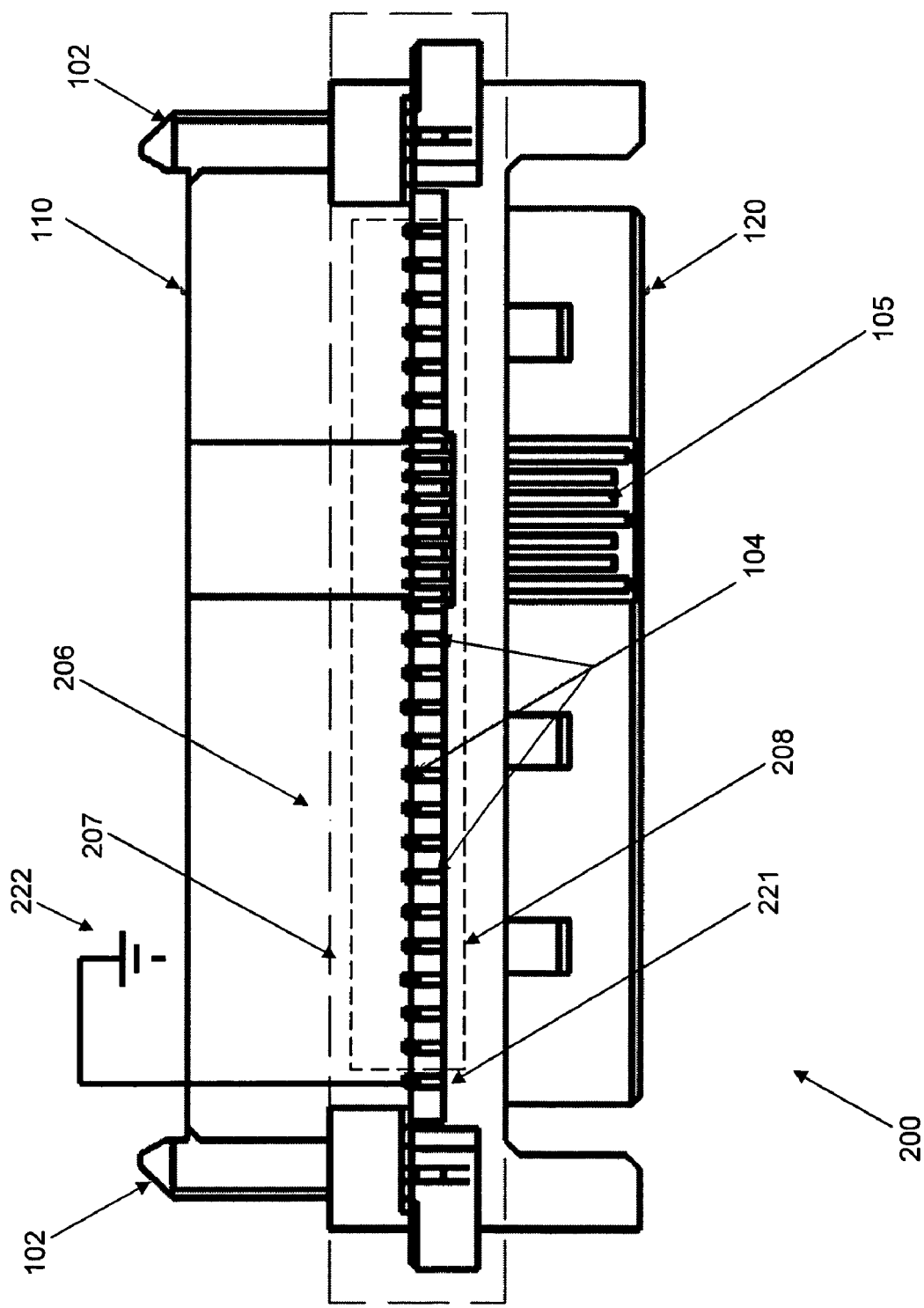
FIG. 4 illustrates a top view of an exemplarily embodiment of the SAS Cable Adapter featuring an overmold area with conductive properties to dissipate static charge.

FIG. 4 illustrates a top view of another exemplarily embodiment of the SAS Cable Adapter 200 featuring an overmold area with conductive properties to dissipate static charge. Referring now to FIG. 4 with continued reference to FIG. 2, the adapter 200 shown in the example embodiment of FIG. 4 includes a structure having an LTO drive side 110 and a SAS-Cable side 120. The adapter 200 incorporates an offset between the centerlines of the LTO side 110 and the SAS-Cable side 120 substantially similar to the offset 140 featured in the example embodiment of FIG. 2. The adapter 200 also has a reduced overmold structure substantially similar to the reduced overmold structure 130 featured in the example embodiment of FIG. 2, on the SAS cable side 120. The adapter includes an enhanced overmold structure 206 on the LTO side 110 of the adapter 200. The LTO side 110 also includes a plurality of insertion guide pins 102 to ensure proper alignment during the insertion of the adapter 200 into the LTO HH tape drive (not shown) wherein the LTO side 110 of the adapter is inserted into the SCSI connector (not shown) of the LTO HH tape drive. The enhanced overmold structure 206 on the LTO side 110 provides a supporting structure for grasping the adapter. A SAS-Cable is inserted in the SAS-Cable side 120 of the adapter 110 and the reduced overmold structure 130 prevents the adapter surfaces from interfering with the cable interface.

The LTO side 110 of the adapter 100 includes data and power connectors 104 disposed thereon as well as at least one ground connector 221 disposed thereon. These connectors 104 and ground connector 221 appear as pins 105 on the cable side 120 of adapter 200. The enhanced overmold structure 206 includes an outer overmold area 207 and an inner overmold area 208, the outer overmold area 207 having conductive properties and the inner overmold area 208 having insulating properties. The inner overmold area 208 insulates the data and power connectors 104 from each other and the conductive outer overmold area 207. The outer overmold area 207 is connected to a ground terminal 221, 222 such that when the adapter 200 is handled to connect the SAS-Cable to the LTO HH tape drive, the outer conductive overmold area 207 dissipates any electric charge imparted thereon by the handler such that the electrostatic discharge does not damage the LTO HH tape drive. Ground connector 221 may physically extend further than data and power connectors 104, so that ground connector 221 engages the LTO drive first, when connector 200 is inserted into the LTO drive, and so that ground connector disengages the LTO drive last, when connector 200 is removed from the LTO drive. The range that ground connector 221 may physically extend further than data and power connectors 104 is from 0 mm to 2 mm.

In another example embodiment the invention resides in a method for coupling a LTO HH tape drive device having a Serial Attached SCSI connector to a SAS-Cable includes employing an adapter having a structure featuring an offset between the centerlines of the LTO side and the SAS-Cable side. The method also includes reducing the overmold structure of the adapter on the SAS Cable Side of the adapter to prevent interference from excess structure contained on the connector during the insertion of the SAS Cable as well as enhancing the overmold structure of the adapter on the LTO drive side of the adapter to facilitate a secure grip on the adapter. The method further includes offsetting the centerlines of the LTO side and the SAS-Cable side to enhance the applicability of the adapter to a wide range of SAS-Cables and guiding the insertion of the adapter into a LTO drive via insertion guide pins to prevent the damage to the adapter pins on the LTO drive side of the adapter.

The exemplary and alternative embodiments described above may be combined in a variety of ways with each other. Furthermore, the steps and number of the various steps illustrated in the figures may be adjusted from that shown.

Although the present invention has been described in terms of particular exemplary and alternative embodiments, it is not limited to those embodiments. For example, the SAS cable connector may be a SATA (Serial ATA) cable connector. Alternative embodiments, examples, and modifications which would still be encompassed by the invention may be made by those skilled in the art, particularly in light of the foregoing teachings.

The invention claimed is:

1. A method for coupling a LTO HH tape drive device having a Serial Attached SCSI connector to a SAS-Cable comprising:
    attaching said LTO HH tape drive device having a Serial Attached SCSI connector to a SAS-Cable with an adaptor, said adapter having a structure featuring an offset between the centerlines of a LTO side and a SAS-Cable side, said LTO side of said adapter including data and power connectors which interface the LTO HH tape drive device;
    reducing a overmold structure of said adapter on said SAS Cable Side of said adapter to prevent interference from excess structure contained on the connector during the insertion of the SAS Cable;
    enhancing a overmold structure of said adapter on said LTO drive side of said adapter to facilitate a secure grip on said adapter;
    incorporating a conductive material on an outer surface of the enhanced overmold structure;
    grounding said conductive material incorporated on said outer surface of the enhanced overmold structure;
    offsetting the centerlines of the LTO side and the SAS-Cable side to enhance the applicability of said adapter to a range of SAS-Cables;
    guiding the insertion of the adapter into the LTO HH tape drive via insertion guide pins to prevent the damage to adapter pins on the LTO drive side of said adapter.

2. An apparatus for coupling a LTO HH tape drive device having a Serial Attached SCSI connector to a SAS-Cable electrical device comprising:
    an adapter for connecting a LTO HH tape drive device with a Serial Attached SCSI connector to a SAS-Cable; said adapter having an LTO side and an SAS-Cable side, and featuring an offset between the centerlines of the LTO side and the SAS-Cable side;
    said SAS-Cable side of the adapter having a reduced overmold structure to prevent interference from excess structure contained on the connector during the insertion of the SAS Cable;
    said LTO side of the adapter having an enhanced overmold structure to facilitate a secure grip on said adapter, said enhanced overmold structure having a conductive surface disposed thereon coupled to an electrical ground, said LTO side of said adapter including data and power connectors which interface the LTO HH tape drive device; and
    a plurality of insertion guide pins for guiding the insertion of the adapter into a LTO drive and prevent the damage to adapter pins on the LTO drive side of said adapter.

3. The apparatus of claim 2 wherein said LTO side of said adapter further comprises at least one ground connector.

4. The apparatus of claim 2 wherein said LTO side enhanced overmold structure further comprises an inner overmold area and an outer overmold area.

5. The apparatus of claim 4 wherein said LTO side enhanced overmold structure's inner overmold area has insulating properties.

6. The apparatus of claim 4 wherein said LTO side enhanced overmold structure's outer overmold area has conducting properties.

7. The apparatus of claim 4 wherein said LTO side enhanced overmold structure's outer overmold area is coupled to said at least one ground connector.

8. The apparatus of claim 7 wherein said enhanced overmold structure's inner overmold area insulates said plurality of data and power connectors from each other and from said outer overmold area.

9. The apparatus of claim 2 wherein said LTO side of said adapter includes:
    data and power connectors above the centerline of said SAS-Cable side, said data and power connectors interface the LTO HH tape drive device, and
    first adapter pins below the centerline of said SAS-Cable side.

10. The apparatus of of claim 9 wherein said SAS-Cable side of said adapter includes second adapter pins for transmitting data and providing power and ground through said data and power connectors to said first adapter pins on said LTO side.

11. The apparatus of of claim 9 wherein said LTO side of said adapter further includes a ground connector.

12. The apparatus of of claim 11 wherein said ground connector extends further away from said SAS-Cable side than said data and power connectors such that said ground connector engages the LTO HH tape drive device before said data and power connectors when said adapter is inserted into the LTO HH tape drive device, and such that said ground connector disengages the LTO HH tape drive device after said data and power connectors when said adapter is removed from the said data and power connectors.

13. The apparatus of of claim 11 wherein said ground connector extends further away from said SAS-Cable side than said data and power connectors by a distance of between 0 mm to 2 mm.

14. An apparatus for coupling a LTO HH tape drive device having a Serial Attached SCSI connector to a SAS-Cable electrical device comprising:
    an adapter for connecting a LTO HH tape drive device with a Serial Attached SCSI connector to a SAS-Cable; said adapter having an LTO side and an SAS-Cable side, and said adapter featuring an offset between centerlines of the LTO side and the SAS-Cable side;
    said LTO side of the adapter having an enhanced overmold structure having a means for providing a secure grip on said adapter and a conductive surface disposed thereon coupled to an electrical ground, said LTO side of said adapter including:
        data and power connectors above the centerline of said SAS-Cable side, said data and power connectors arranged to interface with the LTO HH tape drive device, and
        first adapter pins below the centerline of said SAS-Cable side;
    said SAS-Cable side of the adapter having a reduced overmold structure to prevent interference from excess structure contained on the connector during the insertion of the SAS Cable, said SAS-Cable side of said adapter including second adapter pins for transmitting data and providing power and ground through said data and power connectors to said first adapter pins on said LTO side; and
    a plurality of insertion guide pins for guiding the insertion of the adapter into a LTO drive and prevent the damage to said first adapter pins on the LTO drive side of said adapter.

15. The apparatus of claim 14 wherein said LTO side of said adapter further includes a ground connector.

16. The apparatus of claim 15 wherein said ground connector extends further away from said SAS-Cable side than said data and power connectors so that said ground connector engages the LTO HH tape drive device before said data and power connectors when said adapter is inserted into the LTO HH tape drive device, and so that said ground connector disengages the LTO HH tape drive device after said data and power connectors when said adapter is removed from the said data and power connectors.

17. The apparatus of claim 15 wherein said ground connector extends further away from said SAS-Cable side than said data and power connectors by a distance of between 0 mm to 2 mm.

* * * * *